Sept. 5, 1944.  R. G. TILTON  2,357,437
SHEAVE GAUGE
Filed June 25, 1942  2 Sheets-Sheet 1

Russell George Tilton  INVENTOR
BY Walter R. Bradley  ATTORNEY

Sept. 5, 1944.  R. G. TILTON  2,357,437
SHEAVE GAUGE
Filed June 25, 1942   2 Sheets-Sheet 2

Russell George Tilton
INVENTOR

BY Walter E. Bradley
ATTORNEY

Patented Sept. 5, 1944

2,357,437

UNITED STATES PATENT OFFICE 2,357,437

SHEAVE GAUGE

Russell George Tilton, Mountain Lakes, N. J., assignor to Otis Elevator Company, New York, N. Y., a corporation of New Jersey Application June 25, 1942, Serial No. 448,476

3 Claims. (Cl. 33—170)

The invention relates to gauges, especially depth gauges for the grooves of elevator sheaves.

Elevator cars and their counterweights are suspended by hoisting ropes which usually extend upwardly and over hoisting sheaves at the top of the hatchway. These sheaves are provided with circumferential grooves for receiving the hoisting ropes and providing the desired traction. These grooves may be of different shapes. In the case of gearless machines which are usually double wrap traction installations, i. e., the ropes pass over the hoisting sheave, then around an idler sheave and then back to and again over the hoisting sheave in a second group of grooves, thereby providing a traction angle of 360 degrees, round grooves giving maximum bearing surface are usually utilized. In the case of geared machines, which are usually single wrap traction installations, undercut grooves are provided to give added traction since the traction angle is only 180 degrees.

In each case, as a result of operation of the elevator, wear of both the hoisting ropes and the grooves of the hoisting sheaves takes place. The wear of the sheave grooves is much greater than that of the ropes, due to the difference in material and the fact that the sheave makes several revolutions during the travel of the ropes while the elevator car is making a run. The wear of the various grooves is frequently unequal and differences in effective sheave radius of the various grooves develop which continues at a rate which is greater, the greater these differences become. Also the sheaves become out of round in the grooves. Once a certain difference in effective sheave radius of grooves exists, it is considered advisable to recut the grooves. Thus, it is highly desirable to be able periodically to conveniently determine these relative radii. Also, it is desirable to be able to readily make this determination when replacing ropes.

It is the object of the invention to provide a depth gauge for measuring differences in effective sheave radius of the various grooves of a sheave. It is a further object of the invention to provide such a gauge which is of simple construction, which may be used on various types of sheaves and which gives an accurate micrometric measurement of the relative radii at any point on the circumference of the sheave.

In carrying out the invention, according to the arrangement illustrated in the drawings, the gauge comprises a gauge bar in the form of an elongated plate having an adjustable self-aligning clamp for securing the plate to the rims of the sheave parallel with the driving shaft and tangent to the sheave. A micrometer which extends perpendicular to the plate and thus radially of the sheave is slidably mounted thereon so as to enable it to be positioned in line with the various grooves. The micrometer is clamped in position in line with each groove and a micrometric reading of the effective sheave radius is made. This is not an actual measurement of the sheave radius but a reading which may be used for comparison with other readings taken. If the ropes are in place an insert such as a segmental shim is placed over each rope in making the measurement. If the ropes are out of the grooves, as for example when the gauge can be placed under the sheave, inserts in the form of rope blanks are placed in the rope grooves for making the measurement. This may be repeated at several positions on the sheave to determine if it is out of round in any groove. If the difference between the maximum and minimum readings obtained exceeds a certain amount, the grooves are recut.

A general idea of the invention, the mode of carrying it out which is at present preferred, and the various features and advantages thereof will be gained from the above statements. Other features and advantages of the invention will be apparent from the following description and appended claims.

Figures 1, 2, 4, 5:
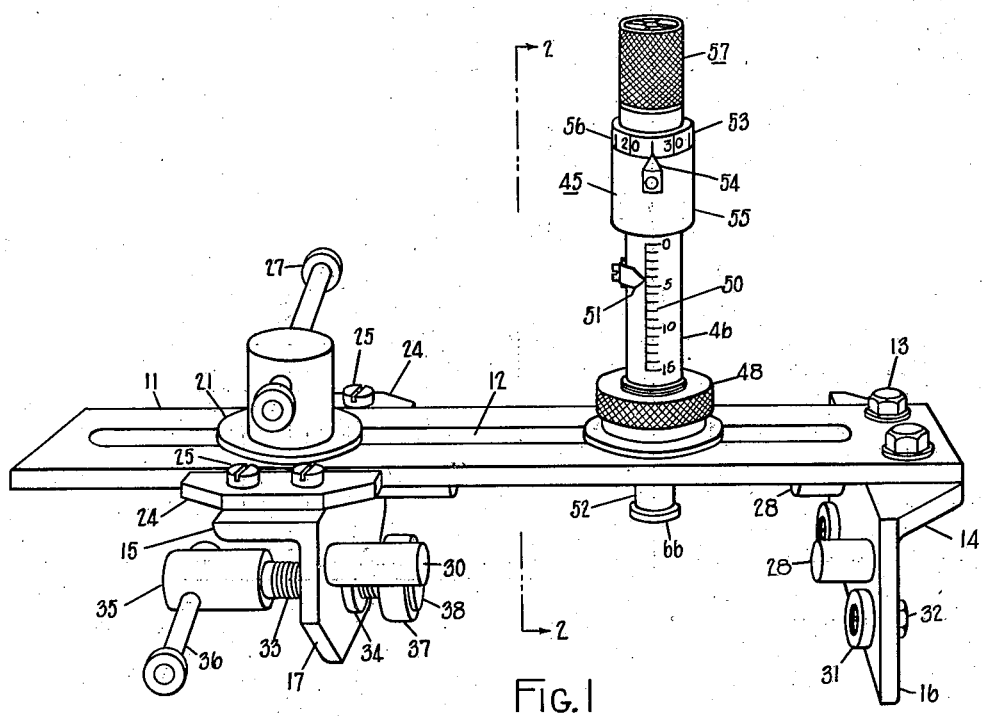
Figure 1 is a perspective view of a gauge embodying the invention.
Figure 2 is a view taken along the line 2—2 of Figure 1, showing the gauge applied to a sheave.
Figure 4 is a perspective view of a rope blank utilized in measuring the depths of the grooves.
Figure 5 is a perspective view of a segmental shim utilized in measuring the depths of the grooves with the ropes in place.

Referring to the drawings, the gauge comprises an elongated flat gauge plate 11 having a longitudinal slot 12 therein. At one end of the plate is secured as by screws 13 an angle bracket 14. Another angle bracket 15 is slidable along the plate to adjust its position with respect to bracket 14. The depending flanges 16 and 17 of brackets 14 and 15 respectively face each other. Bracket 15 is clamped in adjusted position by a screw 18 which is threaded into an aperture 20 in the bracket. The washer 21 is arranged between the plate 11 and the head 22 of the screw whereby the screw upon being tightened clamps the plate between the bracket and the washer to hold the bracket in adjusted position. A shoulder 23 is formed on the head of the screw and extends downwardly into slot 12. A pair of guide blocks 24 are secured to bracket 15 as by screws 25 in spanning relationship to the gauge plate. These blocks together with shoulder 23 serve as a guide for the sliding movement of the bracket. Also the lower end of the screw is provided with a stop collar 26 to maintain the assembled relationship. The head of the screw is provided with an operating handle 27.

Each of depending flanges 16 and 17 is provided with a pair of laterally spaced positioning pins, the pins on flange 16 being designated 28 and being aligned with those on flange 17 which are designated 30. These pins rest on top of the rim of the hoisting sheave when the gauge is in place to position the gauge plate parallel with the driving shaft and tangential to the sheave. Beneath the pins 28 is a pair of leather buttons 31 secured to flange 16 as by bolts 32 for engaging the side of the rim. A clamping screw 33 extends through a threaded bushing 34 in flange 17 midway of buttons 31 for clamping the gauge to the sheave. The head 35 of the screw is provided with an operating handle 36. A cup 37 is mounted to swivel on the end of the screw, a leather button 38 being provided in the cup for engaging the side of the rim of the hoisting sheave. The button 38 and buttons 31 provide a three-point clamp which assures that the plate will be positioned in proper relationship to the sheave.

A micrometer 45 is slidably mounted on the gauge plate between the brackets 14 and 15. The micrometer extends perpendicularly to the plate so that with the gauge in place it extends radially to the sheave shaft. The lower end of the micrometer barrel 46 is formed with a flange 47. This flange is beneath the plate and spans the slot 12. The top of the flange is milled to fit upwardly into the slot to form a guide and to prevent turning of the barrel when the micrometer is clamped to the gauge plate. The barrel is threaded above the flange and a nut 48 is threaded onto the barrel at this point to clamp the micrometer to the plate. The micrometer has a longitudinal scale 50 on the barrel and a pointer 51 for the scale secured to the spindle 52. It also has a rotary scale 53 read in conjunction with a pointer 54 on the barrel cap 55. This rotary scale is on the driven member 56 of friction drive mechanism 57, for the spindle.

Figure 3:
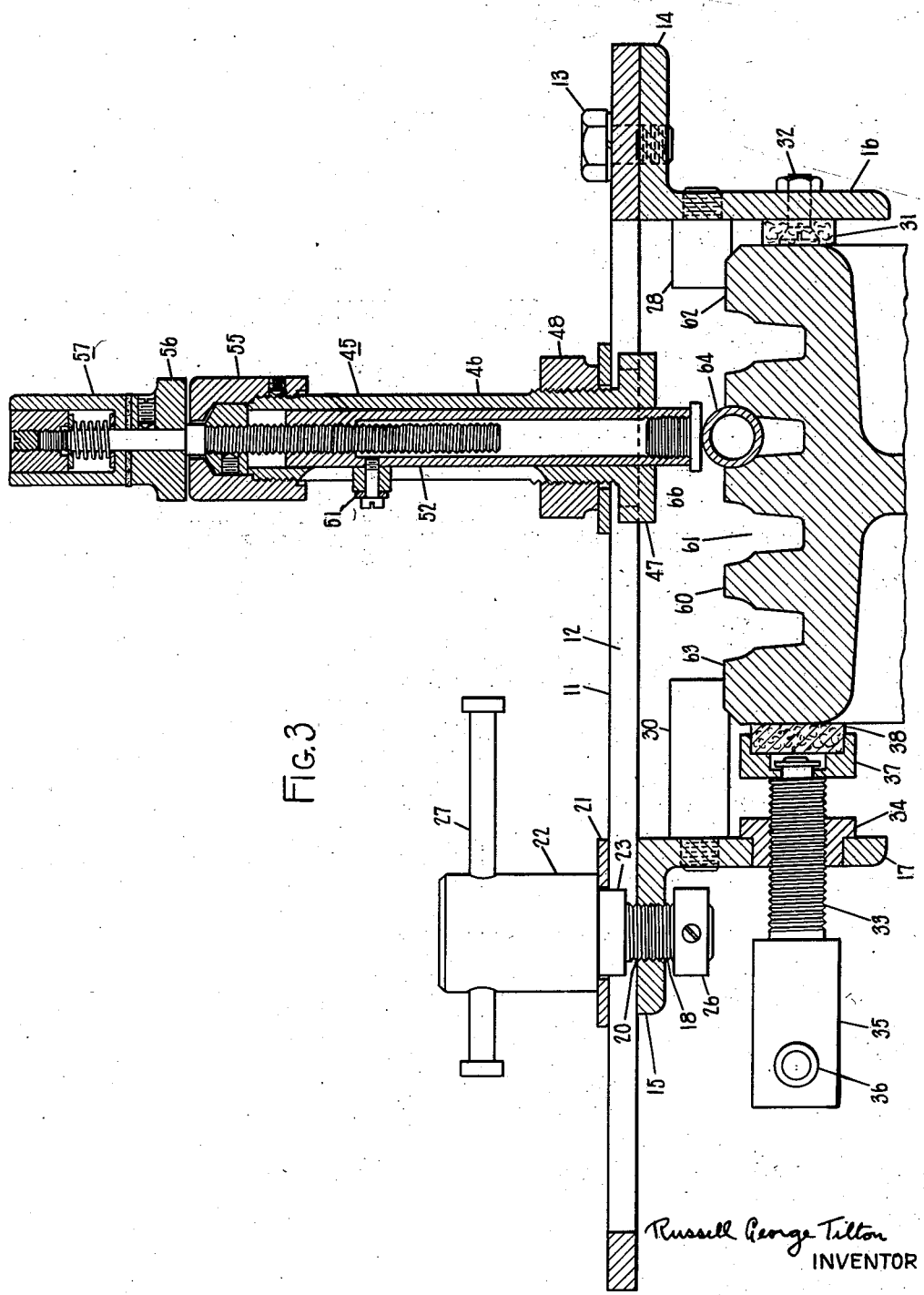
Figure 3 is an enlarged view in longitudinal section of the gauge applied to a sheave.

The gauge is illustrated in Figures 2 and 3 as applied to a hoisting sheave 60 having undercut grooves 61. To apply the gauge to such sheave, with the screw 33 turned back, bracket 15 is clamped by screw 18 in a position to enable the gauge to fit over the sheave with the pins 28 and 30 resting on top of the rim 62. The screw 33 is then turned to lightly clamp the sides of the rim between the button 36 and the buttons 31, thus aligning the gauge tangent to the sheave and parallel with the sheave axis. The micrometer is then slid along the plate into position to place it directly in line with one of the grooves of the sheave and clamped in position. With the ropes out of the grooves as illustrated, a rope blank 64 of the proper size is placed in the groove beneath the micrometer spindle. There are several sizes of these blanks to take the place of different sized ropes, and in each case they are slightly smaller in diameter than the ropes. These blanks are of hollow cylindrical form and are connected together as by chains 65. The spindle of the micrometer is then run down until the cap 66 on the end of the spindle engages the rope blank and the friction mechanism slips. A reading is then taken. The micrometer is moved to another groove and the operation is repeated. Readings are taken in this way for all grooves and preferably in order. The gauge may then be shifted to several other positions, as by rotating the hoisting sheave, and readings are similarly taken in each of these other positions. These readings show the differences in effective sheave radius of the various grooves and also whether any of the grooves are out of round. If the maximum reading exceeds the minimum reading by a certain amount, depending upon the practice for the particular type of installation, the grooves are recut.

In case it is impossible or inconvenient to take the readings with the ropes out of the grooves as for example where the gauge cannot readily be inserted and operated underneath the hoisting sheave, readings may be taken with the ropes in place by placing a segmental shim 67 over the ropes when the readings are taken. This obviates any discrepancies due to the lay of the rope. In case of readings taken in this manner, it is advisable to repeat each reading to insure accurate results. These duplicate readings should be one-half rope lay apart.

While the invention has been described as applied to a sheave having undercut grooves, it is also applicable to sheaves having other types of grooves such as round grooves. Also it is applicable to other sheave arrangements, as for example where the sheave rim is flanged, and to sheaves other than driving sheaves. In case of high rim flanges, the micrometer spindle may have insufficient travel for making the measurements. In such case, a small piece of flat steel stock may be placed on the rope blank or segment and the reading taken on that.

It will be seen therefore that a gauge is provided which is of simple construction and which may be readily applied and manipulated. The gauge plate is of sturdy stock to insure accurate readings and may be reinforced as by ribs along the edges if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Mechanism for measuring the differences in effective sheave radius of the grooves of an elevator hoisting sheave comprising; an elongated gauge bar; a pair of oppositely disposed members for spanning said sheave, one secured to one end of said bar and the other slidably mounted on said bar; means for clamping said slidable member on said bar in position for said members to span said sheave; means carried by said spanning members for securing said bar to said sheave in parallel relationship with the sheave shaft; and a micrometer slidably mounted on said bar in radial relationship to the sheave axis, said micrometer having a movable spindle and means for securing the micrometer in position with said spindle in line with any one of the sheave grooves.

2. Mechanism for measuring the differences in effective sheave radius of the grooves of an elevator hoisting sheave comprising; an elongated plate having a longitudinal slot therein; a pair of oppositely disposed members for spanning said sheave, one secured to one end of said plate and the other slidably mounted in said slot; means secured to said spanning members for engaging the rim of said sheave at the sides of the sheave for positioning said plate parallel to the sheave shaft and tangential to said sheave; means for clamping said slidable member on said plate in position for said members to span said sheave; a pair of abutments secured to one of said members for engaging one side of said sheave along the rim thereof; a clamping screw carried by the other member midway between said abutments and having an abutment on the end thereof for engaging the other side of said sheave along the rim thereof to clamp said gauge bar to said sheave; and a micrometer mounted on said plate in perpendicular relationship thereto, said micrometer being slidable in said slot between said brackets and having a movable spindle and a clamp for securing the micrometer in position with said spindle in line with any one of the sheave grooves.

3. Mechanism for measuring the differences in effective sheave radius of the grooves of an elevator hoisting sheave comprising; an elongated plate having a longitudinal slot therein; a pair of angle brackets, one secured to one end of said plate and the other mounted on said plate for slidable movement in said slot, the flanges of said bracket facing each other and being perpendicular to said plate; a pair of spaced pins secured to each flange to extend inwardly therefrom parallel to said plate and aligned with those on the opposite flange, said pins engaging the rim of said sheave at the sides thereof with said plate in place on said sheave to position said plate tangential to said sheave and parallel to the sheave shaft; means for clamping said other angle bracket on said plate in position with said pins resting on the rim of said sheave; a pair of spaced leather buttons secured to the inner face of the flange of one of said brackets; a clamping screw in the flange of the other bracket extending toward and midway between said buttons and having a leather button in the end thereof, said buttons engaging the sides of said rim upon operation of said screw to clamp said gauge bar to said sheave; a micrometer mounted on said plate in perpendicular relationship thereto, said micrometer being slidable in said slot between said brackets and having a movable spindle and a clamp for securing the micrometer in position with said spindle in line with any one of the sheave grooves; and a rope blank for inserting in each sheave groove in place of the hoisting rope in position to be engaged by the end of said spindle.

RUSSELL GEORGE TILTON.